(12) United States Patent
Eakin

(10) Patent No.: US 9,360,360 B2
(45) Date of Patent: Jun. 7, 2016

(54) SYSTEM FOR MEASURING LEVEL OF DRY BULK MATERIAL IN CONTAINER

(71) Applicant: Osborne Industries Inc., Osborne, KS (US)

(72) Inventor: George R. Eakin, Osborne, KS (US)

(73) Assignee: Osborne Industries Inc., Osborne, KS (US)

( * ) Notice: Subject to any disclaimer, the term of this patent is extended or adjusted under 35 U.S.C. 154(b) by 328 days.

(21) Appl. No.: 14/098,430

(22) Filed: Dec. 5, 2013

(65) Prior Publication Data

US 2014/0157889 A1    Jun. 12, 2014

Related U.S. Application Data

(60) Provisional application No. 61/734,225, filed on Dec. 6, 2012.

(51) Int. Cl.
| | |
|---|---|
| *G01F 23/20* | (2006.01) |
| *G01G 11/08* | (2006.01) |
| *G01G 23/01* | (2006.01) |
| *G01G 3/14* | (2006.01) |

(52) U.S. Cl.
CPC ............ *G01F 23/205* (2013.01); *G01G 23/012* (2013.01); *G01G 3/1402* (2013.01); *G01G 3/1408* (2013.01); *G01G 11/08* (2013.01)

(58) Field of Classification Search
CPC ... A61K 38/00; C07K 14/47; G01N 2500/04; G01N 2500/10; G01N 2500/20; G01N 33/6893
USPC ............... 73/149, 195, 223, 296, 861, 864.63
See application file for complete search history.

(56) References Cited

U.S. PATENT DOCUMENTS

| | | | |
|---|---|---|---|
| 3,513,701 A | 5/1970 | Soltanoff | |
| 3,629,946 A | 12/1971 | Parsons | |
| 3,753,200 A | 8/1973 | Niejadlik | |
| 3,912,954 A | 10/1975 | Baird | |

(Continued)

FOREIGN PATENT DOCUMENTS

| | | |
|---|---|---|
| DE | 10046102 | 3/2002 |
| DE | 10305716 | 5/2004 |

(Continued)

OTHER PUBLICATIONS

International Search Report and Written Opinion of the International Searching Authority, PCT Application No. PCT/US2013/073653, International Filing Date: Dec. 6, 2013.

(Continued)

*Primary Examiner* — John Fitzgerald
*Assistant Examiner* — Gedeon M Kidanu
(74) *Attorney, Agent, or Firm* — Jeffrey L. Thompson; Thompson & Thompson, P.A.

(57) ABSTRACT

A system for measuring a level of dry bulk material within a container has a columnar device supported vertically within the container. The columnar device has a closed lower end and openings through a sidewall thereof for allowing dry bulk material within the container to flow into and out of the columnar device. A load cell is used to measure a weight of the dry bulk material within the columnar device, which is then correlated to the level of dry bulk solids within the container. The columnar device and the sidewall openings therein can be provided in various shapes and configurations.

21 Claims, 4 Drawing Sheets

(56) References Cited

U.S. PATENT DOCUMENTS

| | | | | |
|---|---|---|---|---|
| 4,043,199 A * | 8/1977 | Greer | ................ | G01F 23/16 177/225 |
| 4,065,967 A | 1/1978 | Beeston | | |
| 4,107,994 A | 8/1978 | Sogo | | |
| 4,247,784 A | 1/1981 | Henry | | |
| 4,276,774 A * | 7/1981 | McGookin | ............ | G01F 23/20 73/290 B |
| 4,385,672 A * | 5/1983 | Schepel | ................ | G01G 5/02 177/207 |
| 4,807,471 A * | 2/1989 | Cournane | ............ | G01F 23/284 324/632 |
| 5,076,107 A * | 12/1991 | Timmermans | ........... | G01N 9/08 177/50 |
| 5,233,352 A | 8/1993 | Cournane | | |
| 5,440,310 A | 8/1995 | Schreiner | | |
| 6,341,271 B1 | 1/2002 | Salvo et al. | | |
| 6,608,491 B2 * | 8/2003 | Salmon, Jr. | ........... | G01F 23/161 222/64 |
| 6,732,580 B2 * | 5/2004 | Dirksen | ............. | G01F 23/0023 73/149 |
| 6,986,294 B2 * | 1/2006 | Fromme | ................ | G01B 11/24 73/865.8 |
| 8,531,304 B2 * | 9/2013 | Thibault | ................. | G01F 23/18 340/614 |
| 9,085,381 B2 * | 7/2015 | Gengerke | ................. | B65B 1/32 |
| 2003/0217596 A1 * | 11/2003 | Dirksen | ............. | G01F 23/0023 73/149 |
| 2009/0145365 A1 * | 6/2009 | Mahle | ................. | A01K 5/0114 119/51.01 |

FOREIGN PATENT DOCUMENTS

| | | |
|---|---|---|
| FR | 2490813 | 3/1982 |
| GB | 716958 | 10/1954 |
| RU | 2069318 | 11/1996 |
| RU | 2273003 | 3/2006 |

OTHER PUBLICATIONS

JOWA Consilium, "Metritape Operation Principle & Products," www.consiliumus.com/Metritape.htm, 2008.

"Integra Integrated Management System, Feed-Link," Automated Production Systems, The GSI Group, Inc., Assumption, IL, 2006.

* cited by examiner

SYSTEM FOR MEASURING LEVEL OF DRY BULK MATERIAL IN CONTAINER

RELATED APPLICATIONS

This application claims priority of U.S. Provisional Application No. 61/734,225 filed on Dec. 6, 2012. The content of this prior application is incorporated herein by reference.

BACKGROUND OF THE INVENTION

1. Field of the Invention

The present invention relates generally to devices for measuring the depth of material in containers. In particular, the present invention relates to devices and methods for measuring the depth of dry bulk particulate materials, such as livestock feed, in a container, such as a bin.

2. Description of the Related Art

An ability to measure the level and amount of a dry bulk solid or a liquid or fluid level in a container is often needed to know the rate of use or disappearance of material from the container so that rate of material use can be accurately established to enable the user to monitor and control the use of the material being withdrawn from the container and to know when to restock the container with the material after it is predicted to be depleted. The inventory volume of a given container is also valuable in determining the value of material in the container. Such a measuring device also alerts an operator to avoid overfilling the container and can monitor the refilling operation to ensure that the container is totally filled, but not overfilled.

This requirement is particularly important for agricultural livestock feed bins which are frequently discharged and recharged with feed. Many ways have been developed for making this type of measurement, but all suffer from the problem of being inherently complicated and expensive to employ for low-added value applications like livestock feed, and even though expensive, are often unreliable in the harsh usage environments often found in rural locations where feed bins are employed.

There are several examples in the prior art of bin level measuring devices. For example, Parsons (U.S. Pat. No. 3,629,946) shows a mechanical method which lowers a bell weight on a cable while measuring the length of cable deployed to bring the bell weight into contact with a material upper surface. This electro-mechanical system employs a complex system of pulleys and sheaves to make measurements, which must use moving parts that are subject to wear and damage and which are insensitive to low-density and irregular material surfaces. The cable will also collect feed dust that affects the accuracy of the length measurement owing to the mechanical means used to measure this length. Measurements are discontinuous and periodic, so continuous level changes are not easily recognized.

Baird (U.S. Pat. No. 3,912,954) teaches how the use of an improved narrow-beam ultrasonic transducer can be used to measure the depth of material in a silo by timing reflections of the sound waves from the material surface. This method has been found to be unsuccessful and unreliable in the harsh conditions in which feed bins are used. Further, the reflectivity of variable, low-density feed materials compared to other reflective surfaces such as metal bin supports and sidewalls and complex reflections from such surfaces make this method unreliable.

Greer (U.S. Pat. No. 4,043,199) shows the use of a tube suspended within a silo. The material in the silo compresses the tube and thereby engages and supports a portion of a chain suspended within the tube. The weight of unsupported chain is measured and related proportionately to the total weight of chain to determine the length of supported chain and thereby the depth of material in the silo. This system is complex, relies on a mechanical weight measurement employing electromechanical moving parts, and gives a discontinuous measure of depth which is not easily automated and subject to large errors owing to the approximate nature of the weighing mechanism. McGookin (U.S. Pat. No. 4,276,774) uses a similar method of measuring the unsupported weight of a suspended cable within a silo using a load cell and associated mechanisms, but without the use of the guard tube taught by Greer. This method suffers from the same shortcomings of Greer and is impractical for many applications including livestock feed silos.

A plurality of temperature sensors and associated circuitry are used by Beeston (U.S. Pat. No. 4,065,967) to measure a non-uniform difference in temperature within a silo as a method to detect a discontinuous change in temperature caused by a material change from air to granulated material content. This method is complex and expensive to implement, and level measurements are easily confused by temperature changes that are unrelated to material level, and by the very small changes in temperature caused by low density and low conductivity materials like livestock feed. The method is not continuous, but potentially can increase the frequency of depth measurements by simply increasing the number of temperature sensors.

The damping of a vibrating plate by material in contact with the plate is taught by Sogo (U.S. Pat. No. 4,107,994) as a method to measure material level in a silo. Sogo shows two vibrating plate detectors at the top and bottom of the silo that are used to detect the full and empty condition. Sogo describes the advantages of a vibrating plate device as well as alternatives to this method. A multiplicity of vibrating plate devices might be used together with the detection means taught by Sogo to measure changes in the level of material in a silo in a discontinuous way, but the cost of the system would increase proportionately and require numerous undesirable openings in the sidewall of the bin.

A reflected light-beam triangulation method is taught by Henry (U.S. Pat. No. 4,247,784), but such a system requires optics and photo-detectors that are quickly contaminated in the dusty conditions of livestock feed silos. This method also requires reflective material and complicated and expensive detection and computing equipment to convert small changes in angles of reflections into a depth measurement. Therefore, this method is impractical for inexpensive and reliable feed silo measurement.

Cournane (U.S. Pat. No. 4,807,471) shows a depth measuring method using electrical reflections from an air-material interface within a silo. An electrical wave is created by a frequency generator and conducted by electrical conductors suspended in the silo that convey an alternating frequency electrical wave, which is partially reflected by the air-material interface. The reflected wave is detected by a sophisticated detection circuit and microprocessor and related to depth. Cournane (U.S. Pat. No. 5,233,352) extends this method with improvements, but the method is complex, potentially expensive, and impractical for application for livestock feed silos. Similarly, Schreiner (U.S. Pat. No. 5,440,310) shows a complex microwave radar system for level measurement which suffers from the same deficiencies for common applications like livestock feed silos.

Salvo (U.S. Pat. No. 6,341,271) teaches an inventory method for material held in silos, but does not explain how the contents of silos are to be continuously and automatically measured in any practical way. Salmon (U.S. Pat. No. 6,608, 491) also shows a complex and expensive method for powering and detecting the position of a plurality of paddle sensors arrayed within a silo. The sensors are deflected by the load of material above each paddle so a discontinuous approximate location of the surface of the material in the silo can be known.

Dirksen (U.S. Pat. No. 6,732,580) shows a load cell that monitors the weight of a suspended cable within a silo. The cable is fitted with a terminal weight to increase the sensitivity of the cable/weight assembly to changes in support provided by the material in the silo. The change in weight measured by the load cell is related to the level of contents in the silo. In practice, this system is found to be unreliable and is relatively insensitive to low-density feeds.

Others have used load cells under the three or four legs of bulk bins to measure the contents of bulk bins by weight directly. However, such a method cannot be easily used for silos that are not elevated on legs. These systems are also expensive, lightning strike sensitive, and are influenced by external environmental forces acting on the bin, such as wind, rain, ice, and so forth.

A commercial measuring system sold under the product name, Meritape, by JOWA Consilium US, Inc., Littleton, Mass. 01460-1431, http://www.consiliumus.com, utilizes a resistance element as described at http://www.consiliumus.com/Metritape.htm. An envelope covers a conductive and a resistive element, which are brought into contact with each other by the compression of the envelope by hydrostatic pressure. These envelopes of protective material are formed with an inherent shape and tension bias that is distorted by the hydrostatic pressure. The change in resistance arising from the compression-caused electrical contact is converted into a depth measurement for fluid materials.

The construction used for Meritape works well for relatively dense materials like liquids with high internal pressure, but is not capable of measuring the depth for relatively low-density, dry-bulk materials like livestock feed with low internal pressure because these shaped unsupported envelopes are limited in size by the inherent shape and tension bias that can be attained by unsupported envelopes. These envelopes are not substantially distorted at achievable shapes by dry, bulk materials and are insensitive to low internal pressures of such materials as livestock feed.

SUMMARY OF THE INVENTION

An object of the present invention is to provide a device and method for measuring the depth of dry bulk particulate materials in a container, which device and method are accurate, inexpensive, simple in operation, reliable in harsh usage environments, do not have moving parts subject to wear and damage, are not affected by temperature changes unrelated to material level, and are capable of a long operating life.

To accomplish these and other objects of the present invention, a system for measuring a level of dry bulk solids within a container is provided, which has a columnar device supported vertically within the container. The columnar device has a closed lower end and openings through a sidewall thereof for allowing dry bulk material within the container to flow into and out of the columnar device. A load cell is used to measure a weight of the dry bulk material within the columnar device, which is then correlated to the level of dry bulk solids within the container. The columnar device and the sidewall openings therein can be provided in various shapes and configurations.

According to one aspect of the present invention, a bin level monitoring system is provided comprising: a columnar device adapted to be supported vertically within a bin, the columnar device having a closed lower end and at least one opening through a sidewall thereof for allowing dry bulk material within the bin to flow into and out of the columnar device; and a load cell associated with the columnar device, the load cell being arranged to measure a weight of the dry bulk material within the columnar device.

According to another aspect of the present invention, a combination of a container and a system for measuring a level of dry bulk solids within the container are provided, the system comprising: a columnar device supported vertically within the container, the columnar device having a closed lower end and at least one opening through a sidewall thereof for allowing dry bulk material within the container to flow into and out of the columnar device; and a load cell associated with the columnar device, the load cell being arranged to measure a weight of the dry bulk material within the columnar device, whereby the measured weight can be correlated to the level of dry bulk solids within the container.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF DRAWINGS

The present invention will become more clearly appreciated as the disclosure of the present invention is made with reference to the accompanying drawings. In the drawings.

DETAILED DESCRIPTION OF THE INVENTION

A bin level monitoring system according to the present invention will now be described with reference to FIGS. 1 to 7 of the accompanying drawings.

The present invention provides a simple and low-cost method and device to measure and monitor the level of dry bulk solids in a bin, thereby solving the problems with the prior art systems described above.

Figure 1:
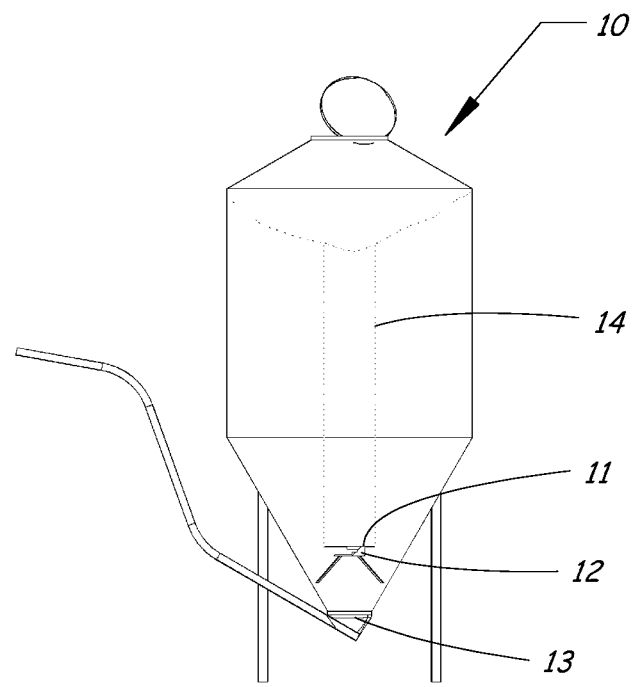
FIG. 1 is an elevation view of a dry bulk container, such as a feed bin, equipped with a conventional bin level monitoring system in which a flat circular plate or cone-shaped hat are supported within the bin.

The origin of the present invention is in understanding the inherent flow characteristics of dry bulk materials that are stored and removed from any type of dry bulk storage container 10, such as a silo, bin, or other storage structure (see FIG. 1). The internal flow characteristics of dry bulk materials can be determined by placing a flat circular plate 11 mounted on a load cell 12 at the bottom of the dry bulk storage container 10 near the outlet 13. Theoretically, the flat circular plate 11 should measure the weight of a cylindrical column 14 of dry bulk material lying directly on top of the plate 11. However, the actual geometry of the dry bulk storage container 10, the dry bulk material particulate size and shape, the moisture content of the dry bulk material, and the dry bulk material friction factor (angle of repose) all effect this measurement when the dry bulk material begins to flow.

Figure 2:
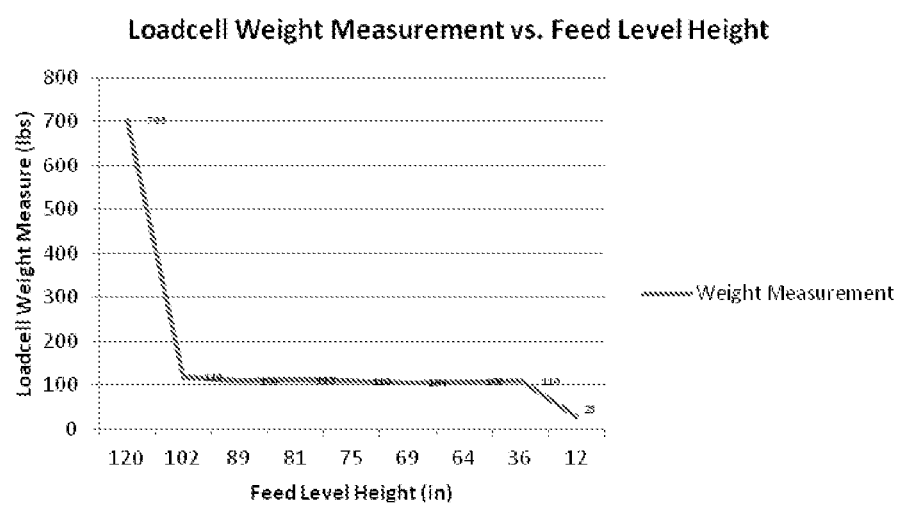
FIG. 2 is a line graph showing the poor relationship between a load cell weight measurement and feed level height using a conventional bin level monitoring system in which a flat circular plate or a cone shaped hat are suspended within the bin.
Figure 3:
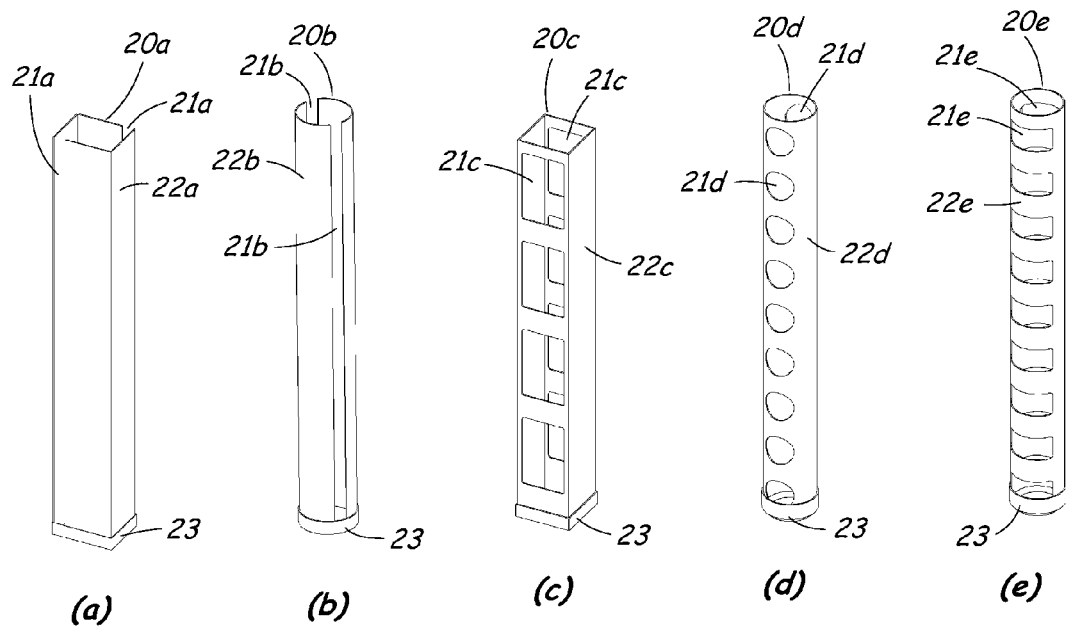
FIGS. 3(a) through 3(e) are perspective views of various columnar devices that can be used in the bin level monitoring system of the present invention to create a column of material to be weighed within a dry bulk container.

Testing of the above described configuration reveals that as dry bulk material is removed from the storage container 10, the weight measurement recorded by the load cell becomes steady (as shown in FIG. 2 for feed level heights between approximately 36 inches and 102 inches). The steady weight measurement is maintained until the dry bulk material level reaches a height (approximately 36 inches in FIG. 2), which is consistent with the material's angle of repose and diameter of the flat circular plate 11. The weight measurement at this point will begin to decrease as material is removed until the only material remaining is a cone shaped pile lying on the flat circular plate 11. Placing a cone shaped hat (not shown) on top of the flat circular plate 11 demonstrates the same weight to material level characteristics, except the cone shaped pile of dry bulk material is removed. Thus, the configuration of a circular plate 11 or a cone-shaped hat mounted on a load cell 12 near the outlet 13 of a container 10 was determined to provide a poor relationship between the feed level height and the load cell weight measurement.

These tests indicate that as dry bulk materials flow through a dry bulk storage container, such as a silo, bin, or other storage structure, the internal flow forces of the material equilibrate to a certain level dependent upon the storage structure geometry, particulate size and shape, moisture content, and angle of repose. The resulting internal forces are equalized to a level that allows the feed to cave off and flow down through the storage structure towards the outlet.

The present invention removes and/or minimizes these variables by constraining a portion of the dry bulk material in a columnar device 20 that creates a column of material that can be weighed without being influenced by the outside parameters described previously. The columnar device 20 can have various shapes and configurations, such as the columnar devices 20a-20e illustrated in FIGS. 3(a) to 3(e). For example, the columnar device 20 can have a rectangular cross section, as shown for columnar devices 20a and 20c in FIGS. 3(a) and 3(c), or a circular cross section, as shown for columnar devices 20b, 20d and 20e in FIGS. 3(b), 3(d) and 3(e). The columnar device 20 will also have at least one opening 21 through a sidewall 22 thereof for allowing bulk material within the container 10 to flow into and out of the columnar device 20, and a closed lower end 23. The sidewall openings 21 allow dry bulk material to enter and exit the columnar device as material levels change.

FIGS. 3(a) and 3(b) illustrate columnar devices 20a, 20b in which openings 21a, 21b extend longitudinally along a length of the device on opposite sides of the device. For example, the openings 21a can be formed at the corners of a columnar device 20a with a rectangular cross section, as shown in FIG. 3(a), or the openings 21b can be formed in opposite sides of a columnar device 20b with a circular cross section, as shown in FIG. 3(b).

FIG. 3(c) illustrates a columnar device 20c having a rectangular cross section with a plurality of rectangular openings 21c through sidewalls 22c on opposite sides of the columnar device 20c. The openings 21c in this embodiment are spaced along a length of the columnar device 20c.

FIG. 3(d) illustrates a columnar device 20d having a circular cross section with a plurality of circular openings 21d through the sidewall 22d on opposite sides of the columnar device 20d. The openings 21d in this embodiment are spaced along a length of the columnar device 20d. However, testing of the use of circular openings 21d placed along the pipe shows that there may be a hysteresis that occurs during the filling and emptying process, which may interfere with the weight measurements with this embodiment.

FIG. 3(e) illustrates a columnar device 20e having a circular cross section with a plurality of rectangular openings 21e through the sidewall 22e on opposite sides of the columnar device 20e. The rectangular openings 21e in this embodiment are spaced along a length of the columnar device 20e. The rectangular openings 21e are perpendicular to the axis of the columnar device 20e and have a length that extends to the tangential edges of the pipe, and a height that is approximately one-half of the length. This configuration allows proper dry bulk material flow into and from the inner volume of the columnar device 20e without obstruction. The center-to-center spacing of the rectangular openings 21e is approximately twice the rectangle height. Testing of the columnar device 20e with rectangular openings 21e shown in FIG. 3(e) resulted in more consistent measurements when dry bulk material was added or removed from the storage structure, as compared to the embodiment with circular openings 21d shown in FIG. 3(d).

Other shapes and configurations for the columnar device 20 and sidewall openings 21 can also be used, as long as a substantially isolated column of dry bulk material is created and the dry bulk material is allowed to flow into and out of the columnar device 20 when material is respectively added or removed from the dry bulk storage container 10. The columnar device 20 must also have a closed lower end 23, such as a bottom cap, to prevent free flow of dry bulk material through the device 20.

Figure 4:
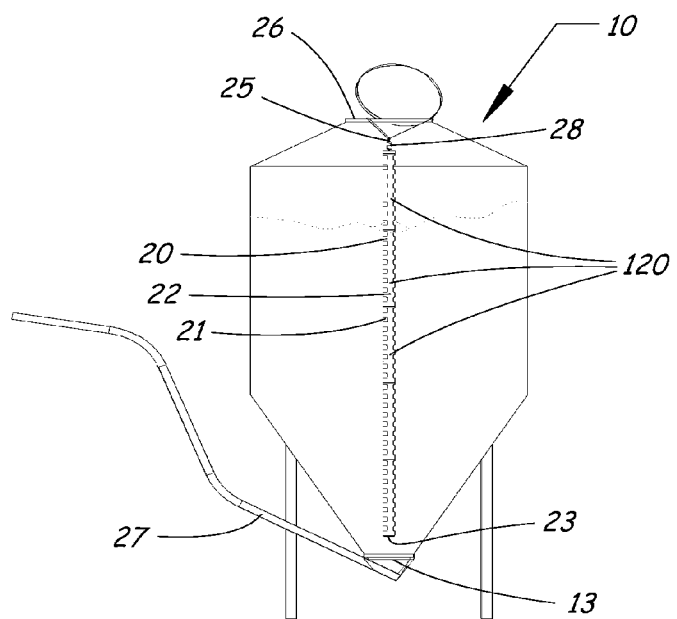
FIG. 4 is another elevation view of the dry bulk container equipped with the bin level monitoring system of the present invention.

The columnar device 20 can be assembled from linear subsections 120, as shown in FIG. 4, so that the final deployed device matches the total depth of a storage structure of any height. The system can also be combined as two or more level monitors connected together to sample and report depths as an average of a number of locally variable depths in a storage container 10. The system can also be combined in a triangular array to measure material level in three directions within a storage container and to measure a wider range of material levels for better accuracy.

One embodiment of the columnar device 20 will be a standard plastic pipe with holes or openings placed perpendicular to the pipe axis through the sidewalls of the pipe. A standard cap 23 can be used to close off the bottom end of the pipe. This is a cost effective solution to creating a device that allows dry bulk material to flow into the center of the pipe and out of the pipe as the storage container 10 is filled or emptied, respectively.

The diameter of the columnar device can be anywhere between 1% to 75% of the diameter or maximum wall-to-wall distance of the storage container 10. The openings 21 that are placed into the columnar device sidewalls 22 can be any shape and have a cross-sectional opening area of 5.0% to 5000% of the internal cross-sectional area of the columnar device 20. These openings 21 are placed along the sidewalls 22 in such spacing to allow the dry bulk material to enter and exit the internal cross-sectional area without obstruction.

Figure 5:
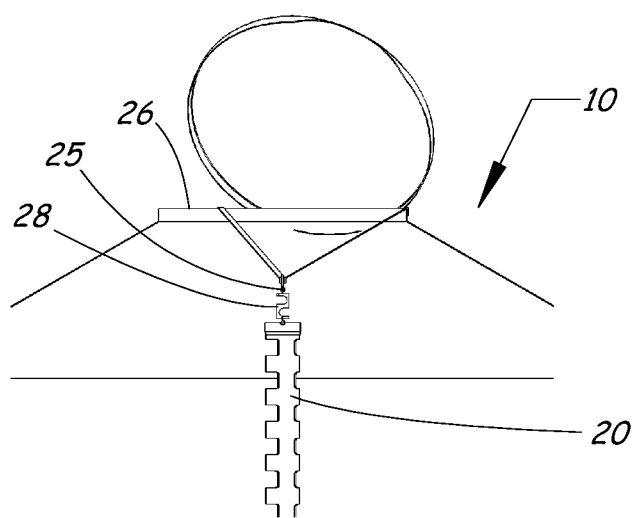
FIG. 5 is a detail elevation view of the top of the dry bulk container showing the columnar device of the bin level monitoring system suspended via a load cell from the roof of the dry bulk container.

The columnar device 20 can be supported from a load cell, either tension or compression, at the top or bottom of the device 20. For example, the device 20 can be hung from a tension load cell 25, as shown in FIGS. 4 and 5, so that the load cell 25 is positioned outside of the dry bulk material, easily accessible for service from the fill access opening 26 of the storage container 10, and will be positioned close to any means of communicating the weight signal to the main interface computer or display. The communication means can be achieved by wireless communication, hard wiring, or other techniques that enable the weight signal to be transmitted to the user.

Figure 6:
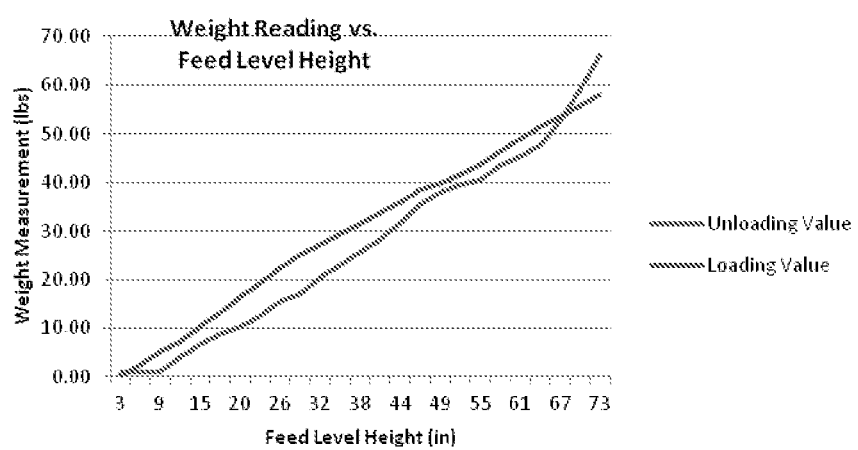
FIG. 6 is a line graph showing the excellent relationship between a load cell weight measurement and feed level height using the bin level monitoring system of the present invention.

Testing of the invention shows that there is a linear characteristic between the feed level in the storage container 10 and the weight measured by the load cell 25, as illustrated in FIG. 6. The testing demonstrates that there is good correlation of the data when feed is loaded and unloaded from the storage container 10. The invention removes the outside influences owing to the dry bulk material flow conditions, and provides an inexpensive means of correlating the weight of material inside of the columnar device 20 to the height level of material inside the storage container 10.

The dry bulk storage container 10, such as a feed bin in this explanation, is positioned in a location such that the dry bulk material contained inside can be transferred to the location where it will be used. This transferring of the dry bulk material is typically done by using a mechanical auger, pneumatic flow, or cable type conveying system 27. The level measuring system of the present invention can use a columnar device 20 having multiple sections 120 attached end-to-end to accommodate the height of the storage container 10. The columnar device 20 has a lower cap 23 that prevents the dry bulk material from exiting the center of the columnar device 20 prematurely during removal of the dry bulk material from the dry bulk material storage container 10. The lower cap 23 keeps the dry bulk material inside of the columnar device 20 until the material exits naturally through the openings 21 in the sidewalls 22 of the columnar device 20 as the material is removed from the dry bulk material storage container 10. The columnar device 20 is suspended by a load cell 25 that measures the weight of the columnar device 20 within the system throughout the entire process of filling and emptying of the dry bulk material. The load cell 25 is connected to a transmitter that sends the load cell's electronic information to a receiver that converts the information into something useful for the manager, operator, or producer. The load cell 25 is suspended by a hanging bracket 28 that is fastened to the top access opening 26 of the bulk storage container 10. Fastening the hanging bracket 28 at this location allows for the columnar device 20 to be mainly located in the center of the material flow, which will result in a better measurement of the material height within the container 10. The columnar device 20 can be mounted in other locations as needed.

Implementation of Invention

The system of measuring a level of dry bulk materials in a container 10 according to the present invention can be implemented as follows. The container 10 can be, for example, a round cylindrical storage bin which is typically used in animal production facilities. The columnar device 20 can be a cylindrical pipe with a series of openings 21 spaced along the length of the pipe, which extend through the pipe sidewalls 22 perpendicular to the pipe axis, as described above. The dry bulk storage container 10 and the columnar device 20 can also have other configurations and geometries, as described above. The concept is the same with the other configurations and geometries, but the placement of the columnar device 20 and numerical calculations may differ slightly.

The columnar device 20 is installed into the feed bin 10 by connecting the columnar device 20 to a tension load cell 25 that is suspended through the top access opening 26 on the feed bin 10. This placement allows the columnar device 20 to be located in the center of the feed bin 10 and directly above the feed bin outlet 13. The overall length of the columnar device 20 should be such that it extends from the feed bin top opening 26 down to approximately 1-foot (0.3 m) above the feed bin outlet 13. The buffer distance between the lower end of the columnar device 20 and the feed bin outlet 13 protects the columnar device 20 from any interference or agitation created by the auger 27 when feed is removed.

The final weight of the columnar device 20 including its closed lower end 23, without any feed placed in the feed bin 10, is measured and will be the tare weight of the level measuring system.

When the level measuring system is installed and properly configured for the feed bin 10, the type of dry bulk material or feed to be used must be weighed to determine an average bulk density. This is achieved by using a measuring cup with a 1-cup capacity. The weight of the measuring cup is measured and deemed to be the tare weight. The measuring cup is filled to the 1-cup level and weighed again. The tare weight is subtracted from the total weight to calculate the feed weight for a single cup. This calculated value will be the feed density ($\dot{\rho}_{cap\ feed}$) in lbs/cup or kg/cup. The cup feed density ($\dot{\rho}_{feed}$) can be converted to the nominal feed density by the formula below.

$$\dot{\rho}_{feed} = C_1 \dot{\rho}_{cup\ feed}$$

Where: $C_1 = 14.438$ in$^3$ (English)

$= 236.588$ cm$^3$ (SI)

The next measurement that must be made on the feed is determining the static friction factor or static angle of repose. The static angle of repose can be determined by pouring the fixed 1-cup of feed through a properly configured funnel that deposits the feed onto the center of a flat surface that has annular rings drawn on the surface. The annular rings are determined by the calculation below and correspond to the static angle of repose for the feed that is measured.

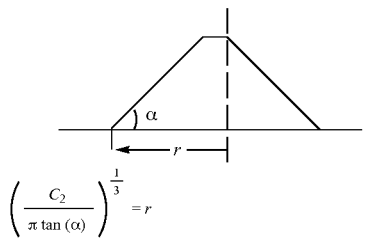

$$\left(\frac{C_2}{\pi \tan(\alpha)}\right)^{\frac{1}{3}} = r$$

Where:
$C_2$ = 43.313 (English)
    = 709.765 (SI)
$r$ = pile radius (inch or cm)
$\alpha$ = static angle of repose The static angle of repose is an approximate measurement and will vary throughout a sampling of feed. Therefore, multiple tests should be preformed and the results averaged to establish a final static angle of repose value for the specific feed or dry bulk material being measured.

As the feed is deposited onto the center of the flat surface, a conical pile of feed will be created. The pile will continue to be formed until all of the feed is emptied from the 1-cup measuring cup. The user can then visually inspect the established feed pile and approximate the static angle of repose by correlating the base edge of the conical feed pile to the nearest designated annular ring value. The measured average static angle of repose value will be used to calculate the volume of feed in the bin when the feed begins to flow through the center of the storage bin.

The internal volume of the columnar device 20 is calculated. For the circular pipe example being used in this discussion, the internal volume would be:

$$V_{int} = \tfrac{1}{4}(\pi d_1^2 L)$$

Where
  $d_1$ = Inside Diameter of Pipe
  $L$ = Overall Length of Pipe

The internal volume of the columnar device 20 is multiplied by the feed density and the units converted, so that the final feed weight calculation has units of pounds or kilograms. This calculation is shown below:

$$Wt_{feed} = \rho_{feed} * V_{int}$$

Where:
  $\rho_{feed}$ = Feed Density
  $V_{int}$ = Pipe Internal Volume

The weight of feed contained in the columnar device 20 is added to the columnar device tare weight to determine the total weight measurement when the feed bin is filled to maximum capacity.

$$Wt_{total} = Wt_{feed} + Wt_{pipe}$$

The total volume of the dry bulk storage structure or feed bin can be calculated using the storage structure geometry. The total volume of a feed bin, used in this example, can be calculated by the following formula:

$$V_{bin} = \tfrac{1}{12}\pi H_1(D_2^2 + D_1 D_2 + D_1^2) + \tfrac{1}{4}(\pi D_2^2 H_2)$$

Where
  $D_1$ = Diameter of Lower Outlet
  $D_2$ = Diameter of Feed Bin Cylinder
  $H_1$ = Height of Cone Section of Bin
  $H_2$ = Height of Cylinder Section of Bin When the feed bin is filled to capacity, the columnar device 20 will fill completely with feed. The load cell 25 will measure a weight in excess of the maximum weight calculated by using the feed density and volume inside of the columnar device 20. The excessive weight is owing to the "packing" of the feed that occurs during the bin filling process. The excess weight value will decrease to a value closer to the calculated total weight when feed begins to be removed from the bin 10 and the columnar device 20 is allowed to equilibrate to the newly filled bin.

The load cell 25 will communicate with the main interface computer and transmit the corresponding weight measurement. This transmitted value will be converted to a weight which will be compared to the maximum calculated weight. If the measured value exceeds the maximum value, then the maximum value will be used for user information. The communications between the level measuring system and the computer interface will continue on a periodic time frame set by the user.

The columnar device 20 will allow feed to flow out from the inside of the pipe as feed is removed from the feed bin 10. As this feed is removed from the bin, the measured load cell weight of the level measuring system will decrease. The corresponding level of feed inside of the columnar device 20 can be determined by the formula below:

$$h = \frac{4(W - Wt)}{\pi d_1^2 \rho_{feed}}$$

Figure 7:
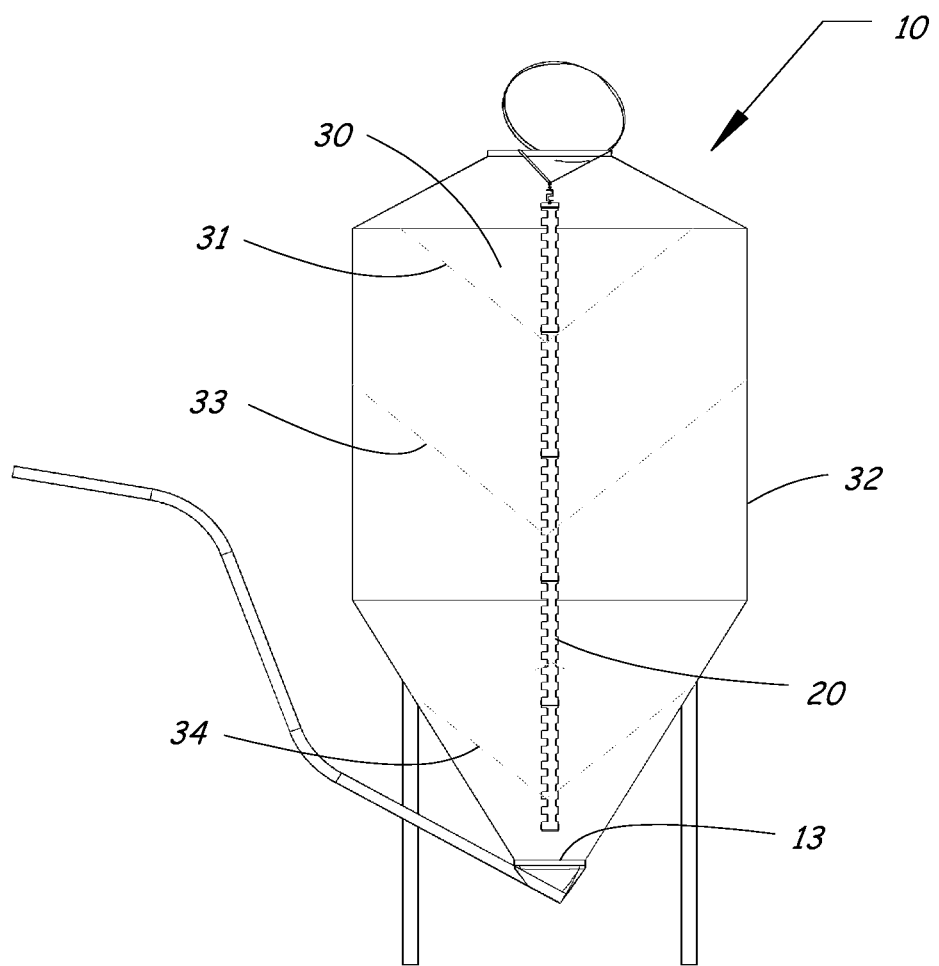
FIG. 7 is another elevation view of the dry bulk container equipped with the bin level monitoring system of the present invention, which illustrates three feed positions that occur during the emptying of feed from the bin.

The level of feed in the bin 10 along with the geometry of the bin can be used to determine the volume of feed remaining in the feed bin. The calculations that are needed will consider three different feed level positions that occur during the emptying of feed from the bin 10, as illustrated in FIG. 7. As feed is removed from the bin 10, an inverted empty cone 30 will be created owing to the feed being removed from the bottom center 13 of the bin. This condition is the opposite of effect that occurs when feed is piled on a flat surface. The feed's angle of repose will define this inverted empty cone 30.

The first feed level position 31 shown in FIG. 7 is where the feed is beginning to flow from the bin 10, but the base of the inverted empty cone 30 has not yet contacted the walls 32 of the cylindrical portion of the bin. The second position 33 is where the base of the inverted cone 30 has contacted the cylindrical walls 32, but has not contacted the bottom edge of the cylindrical wall 32 where the bin begins to taper down to the outlet 13. The third position 34 is when the inverted empty cone 30 begins to enter into the tapered section of the bin.

The feed level in the bin 10, the bin geometry, and the position of the feed in the bin can be used to calculate the volume of feed in the bin at any given moment. The calculations are shown below for a standard cylindrical feed bin, such as the bin illustrated in FIG. 7.

Feed Position 1

$$V_{feed} = V_{bin} - \tfrac{1}{3}\pi\left(\frac{L-h}{\tan\alpha}\right)^2\left(\frac{D_2}{2}\tan\alpha\right)$$

When $L - h \leq \frac{D_2}{2}\tan\alpha$

Feed Position 2

$$V_{feed} = \tfrac{1}{3}\pi\left(\frac{D_2}{2}\right)^2\left(\frac{D_2}{2}\tan\alpha\right) - \tfrac{1}{4}\pi(D_2)^2\left(L - h - \frac{D_2}{2}\tan\alpha\right)$$

When $\frac{D_2}{2}\tan\alpha \leq L - h \leq H_2 + \frac{D_2}{2}\tan\alpha$

-continued

Feed Position 3

$$V_{feed} = \frac{1}{4}\pi H_2(D_2)^2 - \frac{1}{12}\pi(L - H_2 - h - r\tan\alpha)$$

$$[D_2^2 + 2rD_2 + (2r)^2] - \frac{1}{3}\pi r^2 \tan\alpha$$

Where $r = \dfrac{2aH_1}{[2H_1 - \tan\alpha(D_2 - D_1)]}$ and $$a = \frac{(D_2 - D_1)(h - L + H_1 + H_2)}{2H_1} + \frac{D_1}{2}$$

When $L - h > H_2 + \dfrac{D_2}{2}\tan\alpha$

Where:
$D_1$ = Diameter of Lower Outlet
$D_2$ = Diameter of Feed Bin Cylinder
$H_1$ = Height of Cone Section of Bin
$H_2$ = Height of Cylinder Section of Bin
L = Length of Columnar device
h = Height of feed in bin relative to the end of Columnar device
$\alpha$ = Feed Angle of Repose The user will be able to establish several parameters within the User Interface Software that will allow for the transmitted information to be useful. These parameters can be, but are not limited to, the maximum columnar device weight, the minimum columnar device weight, corresponding feed densities for each bin, any scheduled notices for feed changes that may be required when the feed bin reaches a certain level, a maximum disappearance value, a minimum disappearance value, bin level order notification, and individual bin identification, size, dimensions, and location. These parameters will provide the user notice for any issues or changes occurring in the feed storage and handling process. An example would be that if a defective feed delivery system is present, the level monitoring device will record a value that will be constant with previous values indicating that feed is not being consumed. A notice will be presented to the user to inspect the equipment for proper operation. The quick notice for non-moving feed is important owing to the fact that for every day a production animal is off feed, it adds several days to the time it takes for the animal to reach a marketable weight.

The opposite condition of feed disappearing too rapidly is equally important for animal production facilities. The rapid disappearance of feed can indicate that a faulty feed delivery system is occurring and excess feed is being delivered to the feeding equipment. This condition could also indicate that the feed within the storage bin is "bridging" or failing to flow out of the bin causing the center section of the bin to become hollow and as a result no feed flows out of the bin.

The level information from the bins located on the farm coupled with any phase-feeding (changes in feed composition during the animal growing cycle) can be managed automatically through the software and the user defined feed delivery cycles that are established. The user would be able to review or list the entire feed inventory, the respective feed type in each bin, and a projected replenishment date for each bin. This capability will allow the user to have an immediate view of the animal production inputs and know when feed is needed or scheduled to arrive.

The present invention can also be used to coordinate feed delivery trucks with unloading the feed into the correct feed bin. This is a reoccurring problem on animal production facilities and can be solved by connecting the truck's contents to each feed bin via RFID (radio frequency identification) located on the feed bins. The feed delivery truck would approach the targeted feed bin and the RFID reader installed on the delivery truck would read the bin RFID. If the two RFID's corresponded, the truck's contents would be unlocked and allowed to be unloaded into the correct feed bin. If the truck's contents are not unlocked, the truck driver would need to locate the correct bin. This interlocking relationship between the feed bins and the delivery trucks will ensure that the correct feed is delivered to the correct feed bin at the correct time.

While the invention has been described in connection with specific embodiments thereof, it is to be understood that this is by way of illustration and not of limitation, and the scope of the appended claims should be construed as broadly as the prior art will permit.

What is claimed is:

1. A system for measuring a level of dry bulk material in a container, comprising:
    a columnar device adapted to be supported vertically within the container so as to be surrounded by the dry bulk material within the container, said columnar device having a closed lower end and at least one opening through a sidewall thereof for allowing dry bulk material within the container to flow into and out of the columnar device; and
    a load cell associated with said columnar device, said load cell being arranged to measure a weight of the columnar device and the dry bulk material within the columnar device.

2. The system according to claim 1, further comprising a means for correlating the measured weight of the dry bulk material with a level of material in the container.

3. The system according to claim 1, wherein said load cell is a tension load cell, and wherein said columnar device is hung from said load cell.

4. The system according to claim 1, wherein said load cell is a compression load cell.

5. The system according to claim 1, wherein said columnar device is a cylindrical member.

6. The system according to claim 1, wherein said columnar device is a tubular member having a rectangular cross section.

7. The system according to claim 1, wherein said at least one opening comprises first and second longitudinal openings on opposite sides of said columnar device that extend along a length of said columnar device.

8. The system according to claim 1, further comprising a means for communicating a signal from the load cell to a user.

9. The system according to claim 1, wherein said at least one opening has a total cross-section opening area of 5% to 5000% of an internal cross-sectional area of said columnar device.

10. The system according to claim 1, wherein said at least one opening comprises a plurality of openings through the sidewall spaced along a length of said columnar device.

11. The system according to claim 10, wherein said plurality of openings are generally rectangular-shaped openings formed in the sidewall.

12. A system for measuring a level of dry bulk material in a container, comprising:
    a columnar device adapted to be supported vertically within the container, said columnar device having a closed lower end and at least one opening through a sidewall thereof for allowing dry bulk material within the container to flow into and out of the columnar device; and
    a load cell associated with said columnar device, said load cell being arranged to measure a weight of the dry bulk material within the columnar device;

wherein said at least one opening comprises a plurality of openings through the sidewall spaced along a length of said columnar device; and wherein said plurality of openings are generally circular-shaped openings formed in the sidewall.

13. A system for measuring a level of dry bulk material in a container, comprising:
- a columnar device adapted to be supported vertically within the container, said columnar device having a closed lower end and at least one opening through a sidewall thereof for allowing dry bulk material within the container to flow into and out of the columnar device; and
- a load cell associated with said columnar device, said load cell being arranged to measure a weight of the dry bulk material within the columnar device;
- wherein said at least one opening comprises a plurality of openings through the sidewall spaced along a length of said columnar device; and
- wherein said plurality of openings are provided on opposite sides of said columnar device.

14. A system for measuring a level of dry bulk material in a container, comprising:
- a columnar device adapted to be supported vertically within the container, said columnar device having a closed lower end and at least one opening through a sidewall thereof for allowing dry bulk material within the container to flow into and out of the columnar device; and
- a load cell associated with said columnar device, said load cell being arranged to measure a weight of the dry bulk material within the columnar device;
- wherein said at least one opening extends along a length of said columnar device.

15. A system for measuring a level of dry bulk material in a container, comprising:
- a columnar device adapted to be supported vertically within the container, said columnar device having a closed lower end and at least one opening through a sidewall thereof for allowing dry bulk material within the container to flow into and out of the columnar device; and
- a load cell associated with said columnar device, said load cell being arranged to measure a weight of the dry bulk material within the columnar device;
- wherein said columnar device comprises a plurality of linear subsections that are assembled together end-to-end to match a height of the container.

16. In combination, a container and a system for measuring a level of dry bulk material within the container, said system comprising:
- a columnar device supported vertically within said container, said columnar device having a closed lower end and at least one opening through a sidewall thereof for allowing dry bulk material within the container to flow into and out of the columnar device; and
- a load cell associated with said columnar device, said load cell being arranged to measure a weight of the dry bulk material within the columnar device, whereby said measured weight can be correlated to the level of dry bulk material within said container;
- wherein said columnar device is hung from a center peak of said container with said closed lower end positioned above an outlet of said container.

17. In combination, a container and a system for measuring a level of dry bulk material within the container, said system comprising:
- a columnar device supported vertically within said container so as to be surrounded by the dry bulk material within the container, said columnar device having a closed lower end and at least one opening through a sidewall thereof for allowing the dry bulk material within the container to flow into and out of the columnar device; and
- a load cell associated with said columnar device, said load cell being arranged to measure a weight of the columnar device and the dry bulk material within the columnar device, whereby said measured weight can be correlated to the level of dry bulk material within said container.

18. The combination according to claim 17, wherein a diameter of said columnar device is between 1% and 75% of a diameter of said container.

19. A system for measuring a level of dry bulk material in a container, comprising:
- a columnar device adapted to be supported vertically within the container, said columnar device having a closed lower end and at least one opening through a sidewall thereof for allowing dry bulk material within the container to flow into and out of the columnar device; and
- a load cell associated with said columnar device, said load cell being arranged to measure a weight of the dry bulk material within the columnar device;
- wherein said at least one opening comprises a plurality of openings through the sidewall spaced along a length of said columnar device;
- wherein said plurality of openings are generally rectangular-shaped openings formed in the sidewalk and
- wherein said rectangular-shaped openings have a length in a horizontal direction and a height in a vertical direction, and wherein said height is less than said length.

20. The system according to claim 19, wherein said height is approximately one-half of said length.

21. The system according to claim 19, wherein a center-to-center spacing between adjacent openings is approximately twice said height.

* * * * *